April 21, 1959
J. HOFFMANN
2,883,509
SOLDERING DEVICE
Filed May 13, 1958
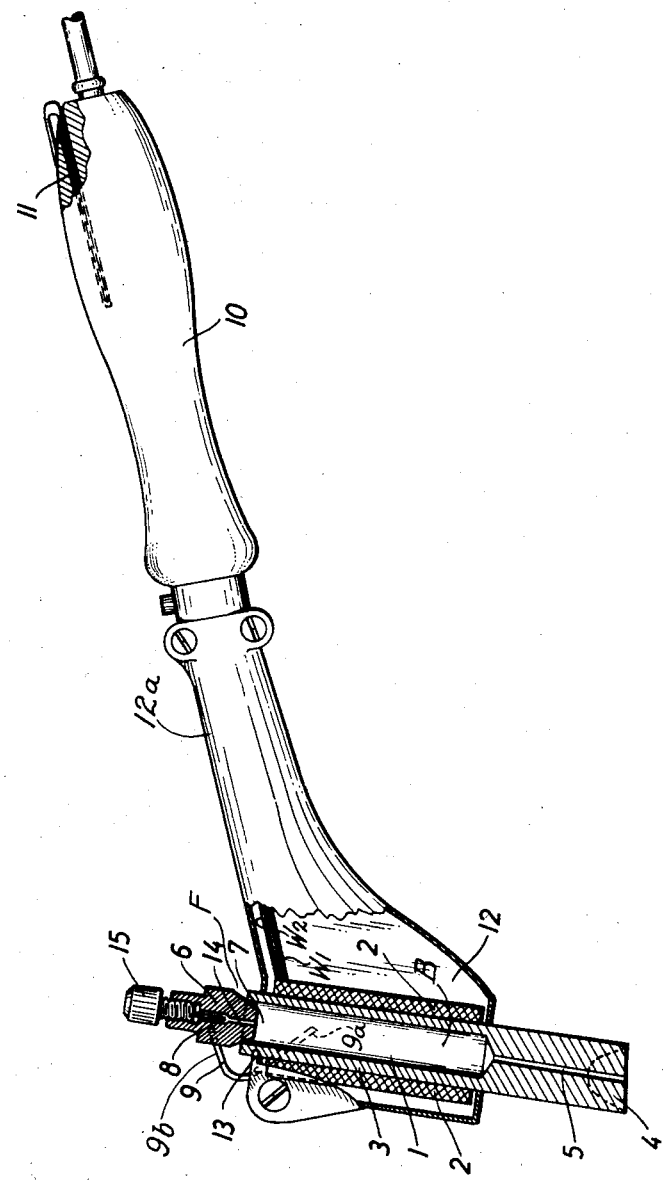
INVENTOR
*Julius Hoffmann*
BY *Michael S. Striker*
*Attorney*

2,883,509
SOLDERING DEVICE

Julius Hoffmann, Mainz, Germany

Application May 13, 1958, Serial No. 734,886

1 Claim. (Cl. 219—27)

This invention relates to a soldering device equipped for automatically supplying to the soldering member the soldering substance to be applied in the soldering operation.

It is among the objects of the present invention to provide a self-contained soldering device in which a supply of soldering substance is kept fluid in an electrically heated reservoir, and reliable control means are provided for regulating the flow of soldering substance from the reservoir to the applicator end portion of the soldering member. This however presents problems because the soldering substance will harden in the device when not in use.

According to the invention, the flow of molten soldering substance from the reservoir is controlled by the manipulation of adjustable air inlet means provided on the reservoir to the maximum effective to release the desired amount of the substance from the reservoir.

According to one feature, the reservoir has a fill opening through which the reservoir may be charged with the soldering substance, which opening is closed by a closure member held in place for airtight closure by an arrangement of resilient pressure means.

In one form of the invention, the reservoir is mounted in a holder for quick removal from the holder, whereas the closure member for the fill opening of the reservoir is resiliently supported on the holder. The resilient mounting may be such that when the reservoir is withdrawn from the holder, the closure member detaches itself from the fill opening, and readjusts itself to closing position on the fill opening when the reservoir is reinserted in the holder.

Other features and advantages will hereinafter appear.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings.

The drawing shows a preferred embodiment exemplary of the invention.

In a preferred form the soldering device of this invention comprises an elongate soldering member 3 of a suitable metallic substance such as copper. This soldering member comprises a hollow portion providing a reservoir for the soldering substance while the opposite end portion constitutes an applicator portion having soldering faces 4 for applying the soldering substance in a soldering operation.

In the present example the soldering member is in the form of a cylindrical body having a wide axial bore B terminating a distance from the applicator faces 4, to constitute the reservoir 1 for the soldering substance. The mouth end of this bore opposite to the applicator faces 4 presents a fill opening whereby the reservoir may be charged with the soldering substance. The fill opening has a closure member 6 which is constructed and mounted with respect to the reservoir in the novel manner further described below.

According to the invention, this closure member has controllable air inlet means for restrictively adjusting the entry of air into the reservoir, such adjustment regulating the flow of molten soldering substance from the reservoir in a manner further to be described. The applicator end portion of the soldering member 3 has a narrow bore or duct 5 coaxial with the wide bore through which the soldering substance may flow from the reservoir to reach the applicator faces 4 located adjacent to the exit opening of duct 5.

Hence, in the form illustrated the soldering member comprises a tubular reservoir member the open end of which presents a fill opening, while the opposite end has a restricted outlet for the soldering substance and is formed with applicator means communicating with the outlet of the reservoir.

The closure member 6 in the example shown is in the form of a plug member having a conical seating face F closing the fill opening by airtight engagement with the edge thereof. This plug member is held in closing position by an arrangement of resilient pressure means herein provided by a spring or springs 9 the mounting and operation of which will be further detailed below.

According to the invention, the plug member has an axial air inlet opening 14 in the form of a fine bore cooperating with a needle valve member 8. This valve member is threaded into the plug member so that it may be turned by means of a heat insulated knob 15 to effect fine adjustment of the air inlet means.

The portion of the soldering member forming the reservoir is surrounded by an electrical heating jacket or electrical resistance coil 2 with terminal wires W1 and W2 shown to lead therefrom through the handle portion of the device.

The heating coil 2 is surrounded by a holder in the form of a housing 12 formed with a lateral neck portion 12a fastened to or clamped around a heat insulated handle 10. The soldering member 3 is held in the holder by means of a projection or detent member 13 so arranged and mounted upon the housing that it is readily disengageable to release the soldering member from the holder.

With the construction of the housing 12 as shown, the spring means 9 is in the form of an angular supporting member of springy material having one shank 9a thereof fixed to the housing and the other shank 9b fixed to the plug member 6 in such a manner that the spring pressure will urge the plug member into airtight closing position upon the fill opening of the reservoir.

While the operation of the device is substantially self-explanatory from the foregoing description with respect to adjusting the flow of soldering substance from the reservoir, it will be seen that the soldering member 3 upon release from the detent member 13 may be withdrawn in axial direction to disengage itself from the plug member 6 due to the spring connection thereof with the housing. Conversely, reinserting the soldering member in the housing and securing it in place by the detent member will cause the plug member 6 to readjust itself to closing position upon the open end of the reservoir under the pressure of the spring means 9.

It will be understood that each of the elements described above, or two or more together, may also find a useful application in other types of soldering devices differing from the types described above.

While the invention has been illustrated and described as embodied in a soldering device featuring a closure member for the reservoir provided with controllable air inlet means such as a needle valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A soldering unit, comprising, in combination, an elongate reservoir member for the soldering substance, having at one end restricted discharge means for said substance, and an open end opposite thereto to constitute a fill opening for placing said substance in said reservoir; applicator means provided on said reservoir adjacent to said discharge means for applying said substance; a holder surrounding said reservoir member and providing a handle portion extending laterally therefrom, said reservoir being mounted in said holder in such a manner as to permit withdrawal thereof in an axial direction; electric heating means for said reservoir for rendering the soldering substance therein fluid so as to be adapted to flow from said reservoir to said applicator means; means for releasably holding said reservoir positioned in said holder; a closure member for said fill opening of the reservoir, provided with an air inlet opening; control means cooperative with said closure member and adjustable for varying the effective area of the air inlet opening so as to adjust the maximum of air admitted into said reservoir, such adjustment regulating the flow of said substance through said discharge opening; and resilient means supporting said closure member on said holder and effective to permanently urge said closure member into closing relationship with respect to the fill opening, said closure member adapted to detach itself from the reservoir when the latter is withdrawn from said holder and adapted to adjust itself to closing position relative to said fill opening when the reservoir is reinserted and positioned in said holder.

References Cited in the file of this patent

UNITED STATES PATENTS

| 1,457,508 | Dellman | June 5, 1923 |
| 1,754,382 | Baracate | Apr. 15, 1930 |

FOREIGN PATENTS

| 155,836 | Switzerland | Sept. 16, 1932 |